(12) United States Patent
Shao et al.

(10) Patent No.: US 11,208,297 B2
(45) Date of Patent: Dec. 28, 2021

(54) POWER SWITCH DEVICE FOR AN OILER OF AN ESCALATOR OR A MOVING WALK

(71) Applicants: KONE Elevators Co., Ltd., Jiangsu (CN); KONE CORPORATION, Helsinki (FI)

(72) Inventors: Minmin Shao, Kunshan (CN); Jian Zhou, Kunshan (CN); Jinming Wang, Kunshan (CN); Hengyuan Gao, Kunshan (CN)

(73) Assignees: KONE ELEVATORS CO., LTD., Jiangsu (CN); KONE CORPORATION, Helsinki (FI)

( * ) Notice: Subject to any disclaimer, the term of this patent is extended or adjusted under 35 U.S.C. 154(b) by 0 days.

(21) Appl. No.: 17/144,515

(22) Filed: Jan. 8, 2021

(65) Prior Publication Data
US 2021/0214190 A1    Jul. 15, 2021

(30) Foreign Application Priority Data

Jan. 9, 2020   (CN) .......................... 202010021288.6

(51) Int. Cl.
| | |
|---|---|
| *B66B 31/00* | (2006.01) |
| *B66B 25/00* | (2006.01) |
| *B65G 45/02* | (2006.01) |
| *B66B 21/02* | (2006.01) |

(52) U.S. Cl.
CPC .............. *B66B 31/00* (2013.01); *B65G 45/02* (2013.01); *B66B 21/02* (2013.01); *B66B 25/00* (2013.01)

(58) Field of Classification Search
CPC ........ B65G 45/02; B65G 45/08; B66B 31/00; B66B 25/00; B66B 25/003; B66B 21/02
USPC ........................................ 198/322, 326, 500
See application file for complete search history.

(56) References Cited

U.S. PATENT DOCUMENTS

| | | | | |
|---|---|---|---|---|
| 1,788,364 A * | 1/1931 | Gies ...................... | B66B 31/003 198/332 |
| 3,195,712 A * | 7/1965 | Boschi .................... | B66B 21/10 198/835 |
| 5,083,653 A * | 1/1992 | Sakata ..................... | G05B 9/03 198/322 |
| 6,471,033 B2 * | 10/2002 | Ulrich ..................... | B66B 31/00 198/321 |

(Continued)

FOREIGN PATENT DOCUMENTS

DE           3129048           *   2/1983   ............. B65G 45/02

*Primary Examiner* — James R Bidwell
(74) *Attorney, Agent, or Firm* — Birch, Stewart, Kolasch & Birch, LLP

(57) ABSTRACT

The present disclosure relates to a power switch device for an oiler of an escalator or a moving walk. The power switch device includes: a power input port, including a first power input terminal and a second power input terminal; a power output port, including a first power output terminal and a second power output terminal, the second power input terminal being connected to the second power output terminal, and a first circuit branch and a second circuit branch connected in parallel being connected between the first power input terminal and the first power output terminal; an electronically controlled on-off apparatus, connected in the first circuit branch; a manual switch, connected in the second circuit branch; and a state indicator, used to indicate a switching state of the manual switch.

7 Claims, 3 Drawing Sheets

(56) References Cited

U.S. PATENT DOCUMENTS

| | | | |
|---|---|---|---|
| 2001/0045340 A1* | 11/2001 | Babler | B66B 31/00 198/326 |
| 2006/0054417 A1* | 3/2006 | Prenner | B66B 31/00 184/15.1 |
| 2007/0272520 A1* | 11/2007 | Smith | B65G 43/02 198/806 |
| 2011/0056226 A1* | 3/2011 | Okubo | H02P 21/34 62/208 |
| 2012/0080420 A1* | 4/2012 | Hui | H02J 3/241 219/482 |
| 2012/0285796 A1* | 11/2012 | Srb-Gaffron | B66B 31/00 198/321 |

* cited by examiner

POWER SWITCH DEVICE FOR AN OILER OF AN ESCALATOR OR A MOVING WALK

TECHNICAL FIELD

The present disclosure relates to an oiler of an escalator or a moving walk, in particular to a power switch device for the oiler of the escalator or the moving walk.

BACKGROUND

Lubricating oil is required for an electric escalator or a moving walk, so the escalator or the moving walk are always equipped with an automatic oiler. A traditional automatic oiler of the escalator or the moving walk is activated only when the escalator or the moving walk is running to refuel the escalator or the moving walk.

In some cases, such as during maintenance, an operator is required to operate the oiler. However, it is dangerous to operate the oiler when the escalator or the moving walk is running.

SUMMARY OF THE INVENTION

The present disclosure relates to a power switch device for an oiler of an escalator or a moving walk, so that an operator may safely operate the oiler of the escalator or the moving walk, and may remind the operator to restore a power supply of the oiler to a normal state.

According to an embodiment of the present disclosure, a power switch device for an oiler of an escalator or a moving walk is provided. The power switch device comprises: a power input port, comprising a first power input terminal and a second power input terminal for connecting to an input power source; a power output port, comprising a first power output terminal and a second power output terminal for connecting to the oiler of the escalator or the moving walk, the second power input terminal being connected to the second power output terminal, and a first circuit branch and a second circuit branch connected in parallel being connected between the first power input terminal and the first power output terminal; an electronically controlled on-off apparatus, connected in the first circuit branch and used to control the on-off of the first circuit branch according to a running signal of the escalator or the moving walk; a manual switch, connected in the second circuit branch and used to control the on-off of the second circuit branch, and a state indicator, used to indicate a switching state of the manual switch.

Optionally, the manual switch is a linked double-pole switch, a first pole switch of the linked double-pole switch is connected in the second circuit branch to control the on-off of the second circuit branch, and a second pole switch of the linked double-pole switch is connected in series with the state indicator between the first power input terminal and the second power input terminal.

Optionally, the electronically controlled on-off apparatus comprises a first signal input terminal and a second signal input terminal for receiving the running signal of the escalator or the moving walk, the first signal input terminal is connected to the first power input terminal, the second signal input terminal is connected to the first power output terminal, and the running signal of the escalator or the moving walk is a running dry contact signal of the escalator or the moving walk, and the first signal input terminal and the second signal input terminal are used to respectively connect to one of two transmission lines for transmitting the running dry contact signal of the escalator or the moving walk.

Optionally, the electronically controlled on-off apparatus comprises a relay, a switch side of the relay is connected in the first circuit branch, and the relay is controlled by the running signal of the escalator or the moving walk to switch on and off at the switch side of the relay.

Optionally, the electronically controlled on-off apparatus comprises a first signal input terminal and a second signal input terminal for receiving the running signal of the escalator or the moving walk, the first signal input terminal is connected to the first power input terminal, the second signal input terminal is connected to one end of a control side of the relay, the other end of the control side of the relay is connected to the second power input terminal, and the running signal of the escalator or the moving walk is a running dry contact signal of the escalator or the moving walk, and the first signal input terminal and the second signal input terminal are used to respectively connect to one of two transmission lines for transmitting the running dry contact signal of the escalator or the moving walk.

Optionally, the power switch device further comprises a circuit breaker, and the circuit breaker is connected between the first power input terminal and the first power output terminal, and is connected in series with a parallel circuit of the first circuit branch and the second circuit branch.

Optionally, the running signal of the escalator or the moving walk comprises an upward running signal of the escalator or the moving walk and a downward running signal of the escalator or the moving walk, and the electronically controlled on-off apparatus comprises a first on-off apparatus and a second on-off apparatus connected in parallel, the first on-off apparatus is used to receive the upward running signal of the escalator or the moving walk, and the second on-off apparatus is used to receive downward running signal of the escalator or the moving walk.

BRIEF DESCRIPTION OF THE DRAWINGS

These and/or other aspects, features and advantages of the present disclosure will become clearer and easier to understand through the following description of the embodiments in conjunction with the accompanying drawings, in which.

DESCRIPTION OF THE EMBODIMENTS

The present disclosure will be described in detail below with reference to exemplary embodiments of the present disclosure. However, the present disclosure is not limited to the embodiments described herein, and it may be implemented in many different forms. The described embodiments are only used to make this disclosure thorough and complete, and to fully convey the concept of the disclosure to those skilled in the art. The features of the various embodiments described may be combined or replaced with each other, unless explicitly excluded or should be excluded according to the context.

In the present disclosure, unless explicitly stated otherwise, "connected" does not mean that it must be "directly connected" or "directly contacted", but only needs to be electrically connected.

As explained in the Background, a traditional automatic oiler of the escalator or the moving walk is activated only when the escalator or the moving walk is running to refuel the escalator or the moving walk. However, in some cases, such as during maintenance, the operator needs to operate the oiler while the oiler is working, but it is dangerous to operate the oiler when the escalator or the moving walk is running. Therefore, the present disclosure conceives a power switch device for providing power to the oiler of the escalator or the moving walk. Through the power switch device, the oiler of the escalator or the moving walk may work when the escalator or the moving walk stops running, thereby facilitating the operator to operate the oiler safely, and may also prompt the operator of a power supply state of the oiler to remind the operator to restore a normal state of the power supply for the oiler of the escalator or the moving walk, that is, a state of automatic refueling only when the escalator or the moving walk is running.

Figure 1:
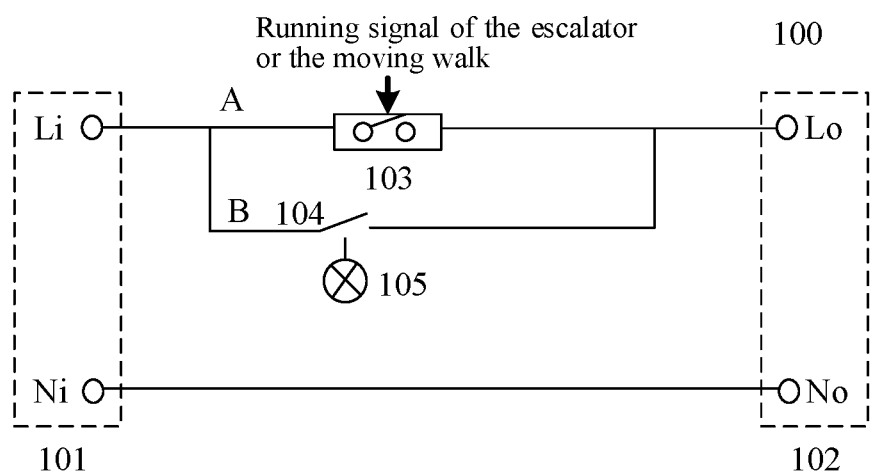
FIG. 1 is a schematic diagram showing a circuit structure of a power switch device for an oiler of an escalator or a moving walk according to one embodiment of the present disclosure.

FIG. 1 is a schematic diagram showing a circuit structure of a power switch device 100 for the oiler of the escalator or the moving walk according to an embodiment of the present disclosure. The power switch device 100 includes a power input port 101, a power output port 102, an electronically controlled on-off apparatus 103, a manual switch 104, and a state indicator 105. The power input port 101 is used to connect to an input power source, so as to finally supply power to the oiler of the escalator or the moving walk through the input power source. The power input port 101 includes a first power input terminal Li and a second power input terminal Ni. For example, the first power input terminal Li is a power positive connection terminal, and the second power input Ni is a power negative connection terminal. The power output port 102 is used to connect to the oiler of the escalator or the moving walk, and includes a first power output terminal Lo and a second power output terminal No. The second power input terminal Ni is connected to the second power output terminal No. A first circuit branch A and a second circuit branch B connected in parallel is connected between the first power input terminal Li and the first power output terminal Lo. Since the first circuit branch A and the second circuit branch B are connected in parallel, as long as either one of the first circuit branch A and the second circuit branch B is connected, the power from the power input port 101 may be transmitted to the power output port 102 in order to provide power to the oiler of the escalator or the moving walk to switch on the oiler of the escalator or the moving walk. The electronically controlled on-off apparatus 103 is connected in the first circuit branch A, and is used to control the on-off (connection or disconnection) of the first circuit branch according to a running signal of the escalator or the moving walk. The running signal of the escalator or the moving walk reflects the running state of the escalator or the moving walk, and has different signal states when the escalator or the moving walk is running and stops running. According to different forms of signals, the electronically controlled on-off apparatus 103 may adopt a variety of implementation manners, such as a relay switch, a semiconductor controllable switch, etc., all of which may control the on-off of the switch according to a control signal. For example, the electronically controlled on-off apparatus 103 may include a relay, a switch side of the relay is connected in the first circuit branch A, and the on-off at the switch side of the relay is controlled by the running signal of the escalator or the moving walk. In addition, the running signal of the escalator or the moving walk may also be a running dry contact signal of the escalator or the moving walk. In this case, the electronically controlled on-off apparatus 103 may only be two connection terminals. When the dry contact signal represents a connection, the two connection terminals are connected to cause the first circuit branch A to be connected, and when the dry contact signal represents a disconnection, the two connection terminals are not connected to cause the first circuit branch A to be disconnected, and the embodiment will be described in detail below. The manual switch 104 is connected in the second circuit branch B and used to control the on-off (connection or disconnection) of the second circuit branch B. The manual switch 104 may be any suitable switch that may be manually opened and closed, for example, a push button switch, a knife switch, and the like. The state indicator 105 is used to indicate a switching state of the manual switch 104. Under the indication of the state indicator 105, the operator may know whether the current manual switch is in the open state or the closed state, thereby reminding the operator to open the manual switch 104 after the operation is completed. The state indicator 105 may be, for example, various indicator lights, and the switching state of the manual switch 104 may also be detected in various ways, for example, the mechanical state change of the manual switch 104 may be detected by a mechanical position sensor, an optical sensor, and the like. The state indicator indicating the switching state of the manual switch 104 may also be realized by linking a power supply switch of the state indicator 105 with the manual switch 104, that is, if the manual switch 104 is closed, the power supply switch of the state indicator 105 is also closed, and if the manual switch 104 is opened, the power supply switch of the state indicator 105 is also opened, so that whether the state indicator 105 is working (for example, the indicator light is on or off) reflects the switching state (opened or closed) of the manual switch 104.

The method of supplying power to the oiler of the escalator or the moving walk through the power switch device 100 of the embodiment of the present disclosure is described below. The power input port 101 is connected to the input power source, and the power output port 102 is connected to the oiler of the escalator or the moving walk. In the normal working state of the oiler of the escalator or the moving walk, that is, without manual operation, the manual switch 104 is opened, that is, the second circuit branch B is opened, and the power supply of the oiler of the escalator or the moving walk is controlled by the first circuit branch A. In this state, if the escalator or the moving walk is running, the electronically controlled on-off apparatus 103 that receives the running signal of the escalator or the moving walk causes the first circuit branch A to be connected, and the oiler of the escalator or the moving walk works by receiving the power from the input power source through the first circuit branch A; on the contrary, if the escalator or the moving walk stops running, the electronically controlled on-off apparatus 103 that receives the running signal of the escalator or the moving walk causes the first circuit branch A to be disconnected, and the oiler of the escalator or the moving walk cannot receive the power from the input power source and therefore cannot work. In the case that the operator is required to operate the oiler of the escalator or the moving walk, the escalator or the moving walk stops running for safety, so that the first circuit branch A is disconnected, the operator manually closes the manual switch 104, and the oiler of the escalator or the moving walk works by receiving the power from the input power source through the second circuit branch B. After the operator completes the operation, the manual switch 104 is manually opened, so that the oiler of the escalator or the moving walk stops working. However, in this case, if there is no indication of the state indicator 105, the operator may forget to open the manual switch 104 after completing the operation on the oiler of the escalator or the moving walk, making the oiler of the escalator or the moving walk work continuously. For this case, the embodiment of the present disclosure designs a state indicator 105. When the operator manually closes the manual switch 104, the state indicator 105 issues an indication, for example, the indicator light is on, and during the closing of the manual switch 104, the indicator light remains on. Therefore, if the operator does not open the manual switch 104 after completing the operation, he will see that the indicator light is on, and realize that the manual switch 104 has not been opened yet, that is, the state indicator 105 may remind the operator to restore the normal state of the power supply for the oiler of the escalator or the moving walk, that is, the state of refueling only where the escalator or the moving walk is running.

It can be seen that through the power switch device of the embodiment of the present disclosure, the oiler of the escalator or the moving walk may work when the escalator or the moving walk stops running, thereby facilitating the operator to operate the oiler safely, and the operator may also be prompted of a power supply state of the oiler to remind the operator to restore a normal state of the power supply for the oiler of the escalator or the moving walk.

Figure 2:
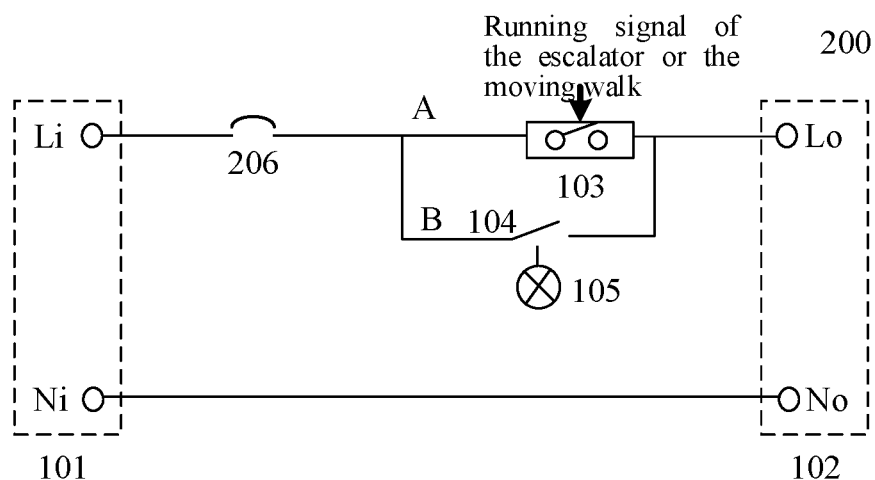
FIG. 2 is a schematic diagram showing a circuit structure of a power switch device for an oiler of an escalator or a moving walk according to another embodiment of the present disclosure.

Optionally, the power switch device may also include a circuit breaker, as shown in FIG. 2. FIG. 2 shows a schematic diagram of a circuit structure of a power switch device 200 including the circuit breaker according to an embodiment of the present disclosure. The description of FIG. 1 is applicable to the components in FIG. 2 with the same reference numerals as those in FIG. 1. The power switch device 200 includes a circuit breaker 206, which is connected between the first power input terminal Li and the first power output terminal Lo, and is connected in series with a parallel circuit of the first circuit branch A and the second circuit branch B. The circuit breaker 206 is used to disconnect the power supply when an accident (for example leakage) occurs in the oiler, so as to protect the oiler from damage or to protect the safety of the operator.

Figure 3:
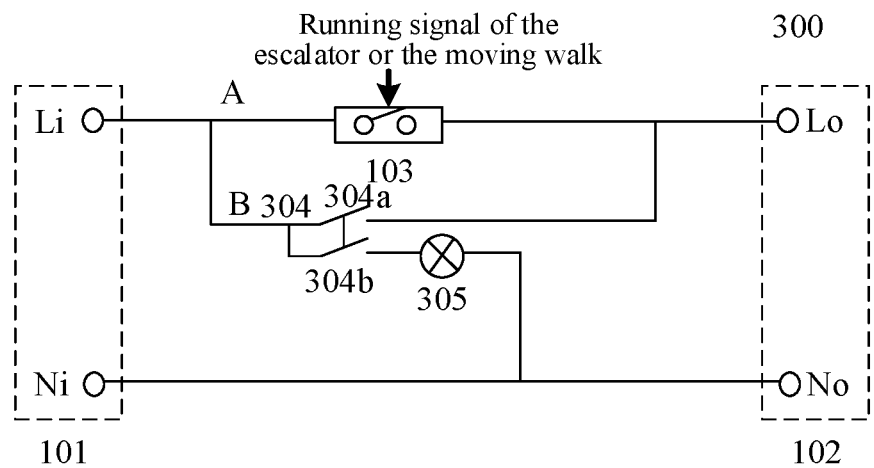
FIG. 3 is a schematic diagram showing a circuit structure of a power switch device for an oiler of an escalator or a moving walk according to another embodiment of the present disclosure.

In some embodiments, the manual switch may be a linked double-pole switch, in which one pole switch is used for on-off control of the second circuit branch B, and the other pole switch is used for power supply of the state indicator. FIG. 3 shows a schematic diagram of a circuit structure of a power switch device 300 according to an embodiment of the present disclosure. The description of FIG. 1 is applicable to the components in FIG. 3 with the same reference numerals as those in FIG. 1. The manual switch 304 of the power switch device 300 is a linked double-pole switch 304. A first pole switch 304a of the linked double-pole switch 304 is connected in the second circuit branch B to control the on-off of the second circuit branch B, and a second pole switch 304b of the linked double-pole switch 304 is connected in series with the state indicator 305 (for example, the indicator light 305) between the first power input terminal Li and the second power input terminal Ni. The two switches of the linked double-pole switch are linked, that is, when the first pole switch is opened, the second pole switch is also opened; when the first pole switch is closed, the second pole switch is also closed. In the example in FIG. 3, when the operator closes the linked double-pole switch, the second circuit branch B is connected and the indicator light 305 is on; when the operator opens the linked double-pole switch, the second circuit branch B is disconnected and the indicator light 305 is off. Therefore, the indicator light 305 may indicate the switching state of the manual switch 304, so as to remind the operator to open the manual switch 304 after completing the operation. This embodiment of the present disclosure may adopt a simple structure to realize a state indication of the manual switch.

Figure 4:
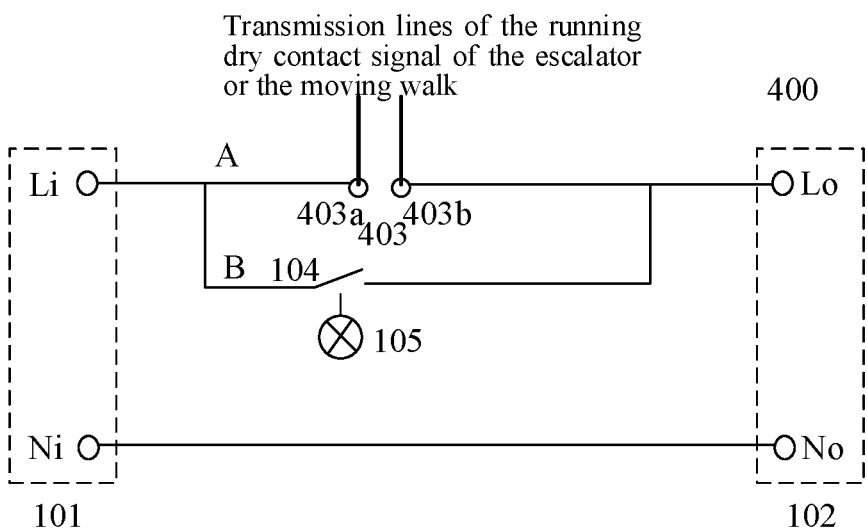
FIG. 4 is a schematic diagram showing a circuit structure of a power switch device for an oiler of an escalator or a moving walk according to another embodiment of the present disclosure.

In some embodiments, the running signal of the escalator or the moving walk may be the running dry contact signal of the escalator or the moving walk. In this case, the electronically controlled on-off apparatus 103 may only be two connection terminals. When the dry contact signal represents a connection, the two connection terminals are connected to cause the first circuit branch to be connected, and when the dry contact signal represents a disconnection, the two connection terminals are not connected to cause the first circuit branch to be disconnected. FIG. 4 shows a schematic diagram of a circuit structure of a power switch device 400 according to an embodiment of the present disclosure. The description of FIG. 1 is applicable to the components in FIG. 4 with the same reference numerals as those in FIG. 1. In the embodiment of FIG. 4, the running signal of the escalator or the moving walk is the running dry contact signal of the escalator or the moving walk, and the running dry contact signal of the escalator or the moving walk comes from a normally open point of a running contactor or relay of the escalator or the moving walk. When escalator or the moving walk is running, the contactor or relay is closed and the dry contact signal is connected. The electronically controlled on-off apparatus 403 includes a first signal input terminal 403a and a second signal input terminal 403b, the first signal input terminal 403a is connected to the first power input terminal Li, and the second signal input terminal 403b is connected to the first power output terminal Lo. The first signal input terminal 403a and the second signal input terminal 403b are used to receive the dry contact signal of the escalator or the moving walk. Specifically, the first signal input terminal 403a and the second signal input terminal 403b are used to respectively connect to one of two transmission lines for transmitting the running dry contact signal of the escalator or the moving walk. The running dry contact signal of the escalator or the moving walk is usually transmitted by two transmission lines connecting to two normally open points of the running contactor or relay of the escalator or the moving walk respectively. When the running contactor or relay of the escalator or the moving walk is in the open state (when the escalator or the moving walk stops running), the two transmission lines are disconnected, so that the first signal input terminal 403a and the second signal input terminals 403b are also disconnected, therefore the first circuit branch A is disconnected. When the running contactor or relay of the escalator or the moving walk is closed (when the escalator or the moving walk is running), the two transmission lines are connected, so that the first signal input terminal 403*a* and the second signal input terminal 403*b* are also connected, therefore the first circuit branch A is connected, and the oiler of the escalator or the moving walk may be refueled normally. Therefore, in the embodiment of FIG. 4, the electronically controlled on-off apparatus 403 may realize the on-off of the first circuit branch A according to the running dry contact signal of the escalator or the moving walk.

Figure 5:
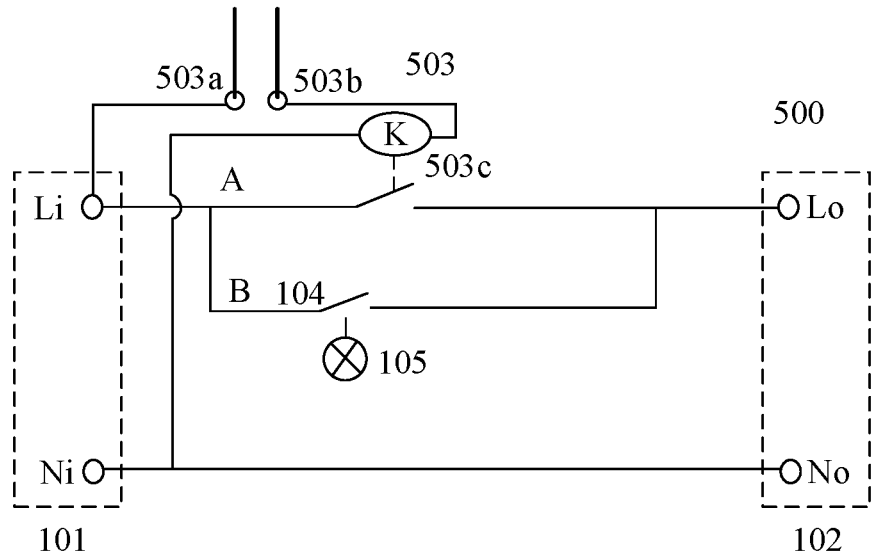
FIG. 5 is a schematic diagram showing a circuit structure of a power switch device for an oiler of an escalator or a moving walk according to another embodiment of the present disclosure.

In some embodiments, the electronically controlled on-off apparatus may further include a relay, a switch side of the relay is connected to the first circuit branch, and the relay is controlled by the running signal of the escalator or the moving walk to switch on and off at the switch side of the relay. In these embodiments, the running signal of the escalator or the moving walk may also be the running dry contact signal of the escalator or the moving walk. FIG. 5 shows a schematic diagram of a circuit structure of a power switch device 500 according to an embodiment of the present disclosure. The description of FIG. 1 is applicable to the components in FIG. 5 with the same reference numerals as those in FIG. 1. In addition, the description of the running dry contact signal of the escalator or the moving walk in FIG. 4 is also applicable to FIG. 5. As shown in FIG. 5, the electronically controlled on-off apparatus 503 includes a first signal input terminal 503*a*, a second signal input terminal 503*b* and a relay 503*c*. The first signal input terminal 503*a* is connected to the first power input terminal Li, the second signal input terminal 503*b* is connected to one end of a control side of the relay 503*c*, and the other end of the control side of the relay 503*c* is connected to the second power input terminal Ni. The first signal input terminal 503*a* and the second signal input terminal 503*b* are used to respectively connect to one of two transmission lines for transmitting the running dry contact signal of the escalator or the moving walk. A switch side of the relay 503*c* is connected in the first circuit branch A. In this embodiment, when the running dry contact signal of the escalator or the moving walk represents a disconnection, the first signal input terminal 503*a* and the second signal input terminal 503*b* are disconnected, so that no current flows through the control side of the relay 503*c*, thereby the switch side remaining open; when the running dry contact signal of the escalator or the moving walk represents a connection, the first signal input terminal 503*a* and the second signal input terminal 503*b* are connected, so that a current flows through the control side of the relay 503*c*, thereby the switch side being connected. Therefore, in the embodiment of FIG. 5, the electronically controlled on-off apparatus 503 may realize the on-off of the first circuit branch A according to the running dry contact signal of the escalator or the moving walk. Optionally, the first signal input terminal 503*a*, the second signal input terminal 503*b*, and the control side of the relay 503*c* in FIG. 5 may also be connected to other power sources different from the power input terminals Li and Ni, thereby isolating the power of the control side and the switch side of the relay 503*c*.

Figure 6:
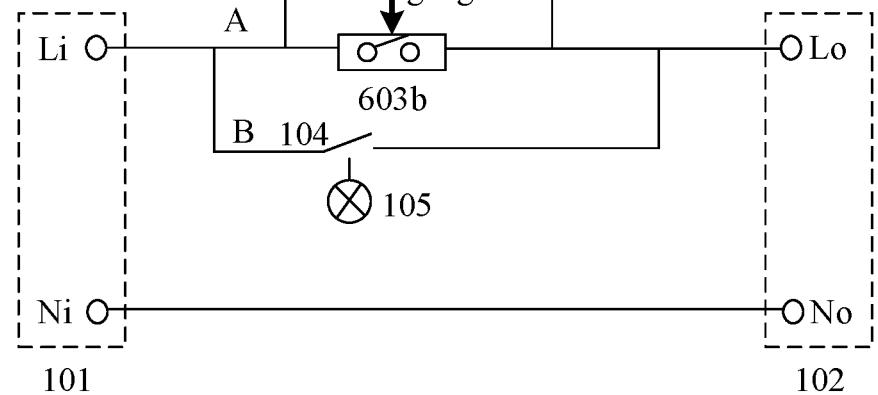
FIG. 6 is a schematic diagram showing a circuit structure of a power switch device for an oiler of an escalator or a moving walk according to another embodiment of the present disclosure.

In some embodiments of the present disclosure, the running signal of the escalator or the moving walk may include an upward running signal of the escalator or the moving walk and a downward running signal of the escalator or the moving walk, and the first circuit branch may be connected when either one of the two running signals indicates that the elevator is running. The upward running signal of the escalator represents a signal when the escalator is running up, the downward running signal of the escalator represents a signal when the escalator is running down, and upward running signal of the moving walk and the downward running signal of the moving walk may each represent a signal that the moving walk is running towards one direction. For example, the electronically controlled on-off apparatus may include two on-off apparatus connected in parallel, which respectively receive the upward running signal of the escalator or the moving walk and the downward running signal of the escalator or the moving walk. FIG. 6 shows a schematic diagram of a circuit structure of a power switch device 600 according to an embodiment of the present disclosure. The description of FIG. 1 is applicable to the components in FIG. 6 with the same reference numerals as those in FIG. 1. As shown in FIG. 6, the electronically controlled on-off apparatus 603 includes a first on-off apparatus 603*a* and a second on-off apparatus 603*b* connected in parallel. The first on-off apparatus 603*a* is used to receive the upward running signal of the escalator or the moving walk, and the second on-off apparatus 603*b* is used to receive downward running signal of the escalator or the moving walk. In the example of FIG. 6, as long as either one of the upward running signal of the escalator or the moving walk and the downward running signal of the escalator or the moving walk indicates that the escalator or the moving walk is running, the first on-off apparatus 603*a* or the second on-off apparatus 603*b* may cause the first circuit branch A to be connected, so that the oiler of the escalator or the moving walk may refuel normally.

The exemplary implementation of the power switch device according to the present disclosure has been described above through the embodiments. Through the power switch device of the embodiment of the present disclosure, the oiler of the escalator or the moving walk may work when the escalator or the moving walk stops running, thereby facilitating the operator to operate the oiler safely, and the operator may also be prompted of a power supply state of the oiler to remind the operator to restore a normal state of the power supply for the oiler of the escalator or the moving walk. Obviously, the components of the embodiments of the above accompanying drawings may be used in combination or substitution. For example, the circuit breaker 106 in FIG. 2 may be applicable to FIGS. 3 to 6, and the linked double-pole switch 304 and its connection manner with the state indicator 305 may be applicable to FIG. 4 and FIG. 5, and the running signal of the escalator or the moving walk in FIG. 4 and in FIG. 5 may be applicable to the upward running signal of the escalator or the moving walk and/or the downward running signal of the escalator or the moving walk in FIG. 6.

The block diagrams of circuits, means, apparatus, devices, and systems involved in the present disclosure are merely illustrative examples and are not intended to require or imply that they must be connected, arranged, and configured in the manner shown in the block diagrams. As those skilled in the art will recognize, these circuits, means, apparatus, devices, and systems may be connected, arranged, and configured in any manner, as long as the desired purpose may be achieved.

Those skilled in the art should understand that the specific embodiments described above are only examples and not limitations. Various modifications, combinations, partial combinations and replacements may be made to the embodiments of the present disclosure according to design requirements and other factors, as long as they fall within the scope of the appended claims or their equivalents, that is, they belong to the scope of claims to be protected by the present disclosure.

What is claimed is:

1. A power switch device for an oiler of an escalator or a moving walk, wherein the power switch device comprises:
   a power input port, comprising a first power input terminal and a second power input terminal for connecting to an input power source;
   a power output port, comprising a first power output terminal and a second power output terminal for connecting to the oiler of the escalator or the moving walk, the second power input terminal being connected to the second power output terminal, and a first circuit branch and a second circuit branch connected in parallel being connected between the first power input terminal and the first power output terminal;
   an electronically controlled on-off apparatus, connected in the first circuit branch and used to control the on-off of the first circuit branch according to a running signal of the escalator or the moving walk;
   a manual switch, connected in the second circuit branch and used to control the on-off of the second circuit branch; and
   a state indicator, used to indicate a switching state of the manual switch.

2. The power switch device of claim 1, wherein,
   the manual switch is a linked double-pole switch,
   a first pole switch of the linked double-pole switch is connected in the second circuit branch to control the on-off of the second circuit branch, and
   a second pole switch of the linked double-pole switch is connected in series with the state indicator between the first power input terminal and the second power input terminal.

3. The power switch device of claim 1, wherein,
   the electronically controlled on-off apparatus comprises a first signal input terminal and a second signal input terminal for receiving the running signal of the escalator or the moving walk, the first signal input terminal is connected to the first power input terminal, the second signal input terminal is connected to the first power output terminal, and
   the running signal of the escalator or the moving walk is a running dry contact signal of the escalator or the moving walk, and the first signal input terminal and the second signal input terminal are used to respectively connect to one of two transmission lines for transmitting the running dry contact signal of the escalator or the moving walk.

4. The power switch device of claim 1, wherein,
   the electronically controlled on-off apparatus comprises a relay, a switch side of the relay is connected in the first circuit branch, and
   the relay is controlled by the running signal of the escalator or the moving walk to switch on and off at the switch side of the relay.

5. The power switch device of claim 4, wherein,
   the electronically controlled on-off apparatus comprises a first signal input terminal and a second signal input terminal for receiving the running signal of the escalator or the moving walk, the first signal input terminal is connected to the first power input terminal, the second signal input terminal is connected to one end of a control side of the relay, the other end of the control side of the relay is connected to the second power input terminal, and
   the running signal of the escalator or the moving walk is a running dry contact signal of the escalator or the moving walk, and the first signal input terminal and the second signal input terminal are used to respectively connect to one of two transmission lines for transmitting the running dry contact signal of the escalator or the moving walk.

6. The power switch device of claim 1, wherein,
   the power switch device further comprises a circuit breaker, and
   the circuit breaker is connected between the first power input terminal and the first power output terminal, and is connected in series with a parallel circuit of the first circuit branch and the second circuit branch.

7. The power switch device of claim 1, wherein,
   the running signal of the escalator or the moving walk comprises an upward running signal of the escalator or the moving walk and a downward running signal of the escalator or the moving walk, and
   the electronically controlled on-off apparatus comprises a first on-off apparatus and a second on-off apparatus connected in parallel, the first on-off apparatus is used to receive the upward running signal of the escalator or the moving walk, and the second on-off apparatus is used to receive downward running signal of the escalator or the moving walk.

* * * * *